US006173184B1

(12) United States Patent
Kikuchi et al.

(10) Patent No.: US 6,173,184 B1
(45) Date of Patent: Jan. 9, 2001

(54) NETWORK SYSTEM FOR MOBILE RADIO COMMUNICATION WITH LINE SWITCHING

(75) Inventors: Tsuneyuki Kikuchi, Kanagawa; Hidehiro Matsumoto, Tokyo, both of (JP)

(73) Assignee: NEC Corporation, Tokyo (JP)

( * ) Notice: Under 35 U.S.C. 154(b), the term of this patent shall be extended for 0 days.

(21) Appl. No.: 08/840,797

(22) Filed: Apr. 16, 1997

(30) Foreign Application Priority Data

Apr. 18, 1996 (JP) .................................................... 8-096696

(51) Int. Cl.[7] ...................................................... H04Q 7/20
(52) U.S. Cl. ............................ 455/445; 455/426; 370/252
(58) Field of Search ................................... 455/422, 450, 455/513, 514, 561, 557, 560, 445, 426; 370/252, 338, 401, 428, 253, 332, 410, 522

(56) References Cited

U.S. PATENT DOCUMENTS

| 5,367,558 | * | 11/1994 | Gillig et al. ........................... 455/425 |
| 5,627,829 | * | 5/1997 | Gleeson et al. ....................... 370/230 |
| 5,794,141 | * | 8/1998 | Aicker ................................... 455/418 |
| 5,809,415 | * | 9/1998 | Rossmann ............................ 455/422 |
| 5,850,517 | * | 12/1998 | Verkkler et al. ................. 370/200.32 |
| 5,956,652 | * | 9/1999 | Eriksson ............................... 455/555 |
| 5,966,663 | * | 10/1999 | Gleason ............................... 455/466 |
| 6,055,430 | * | 4/2000 | Cooper et al. ........................ 455/445 |

FOREIGN PATENT DOCUMENTS 59-212040   11/1984   (JP).
WO 95/01694 * 6/1994 (WO) ......................... H04M 11/00

* cited by examiner

Primary Examiner—Edward F. Urban
Assistant Examiner—Tilamun Gesesse
(74) Attorney, Agent, or Firm—Sughrue, Mion, Zinn, Macpeak & Seas, PLLC

(57) ABSTRACT

A network system for mobile radio communication includes a network constituted by a server unit and a client unit, a radio connection unit connected to a communication network, a public radio base station installed in a cell, and a mobile radio terminal which establishes a radio channel with the public radio base station while moving. The network system performs data communication between the server unit and the mobile radio terminal. Each of the server unit and the mobile radio terminal includes a buffer memory and an auxiliary storage unit which hold data. The mobile radio terminal includes an electric field strength monitoring section for monitoring slot errors or a reduction in electric field strength, a section for storing data in the buffer memory during data transmission to the server unit when the level based on slot errors or a reduction in electric field strength is equal to or higher than a threshold for line switching, a section for sending a line switching notification to the server unit, a section for sending a line switching request to the public radio base station, and a section for starting to transmit the data stored in the buffer memory upon reception of a response indicating completion of line switching from the public radio base station.

10 Claims, 14 Drawing Sheets

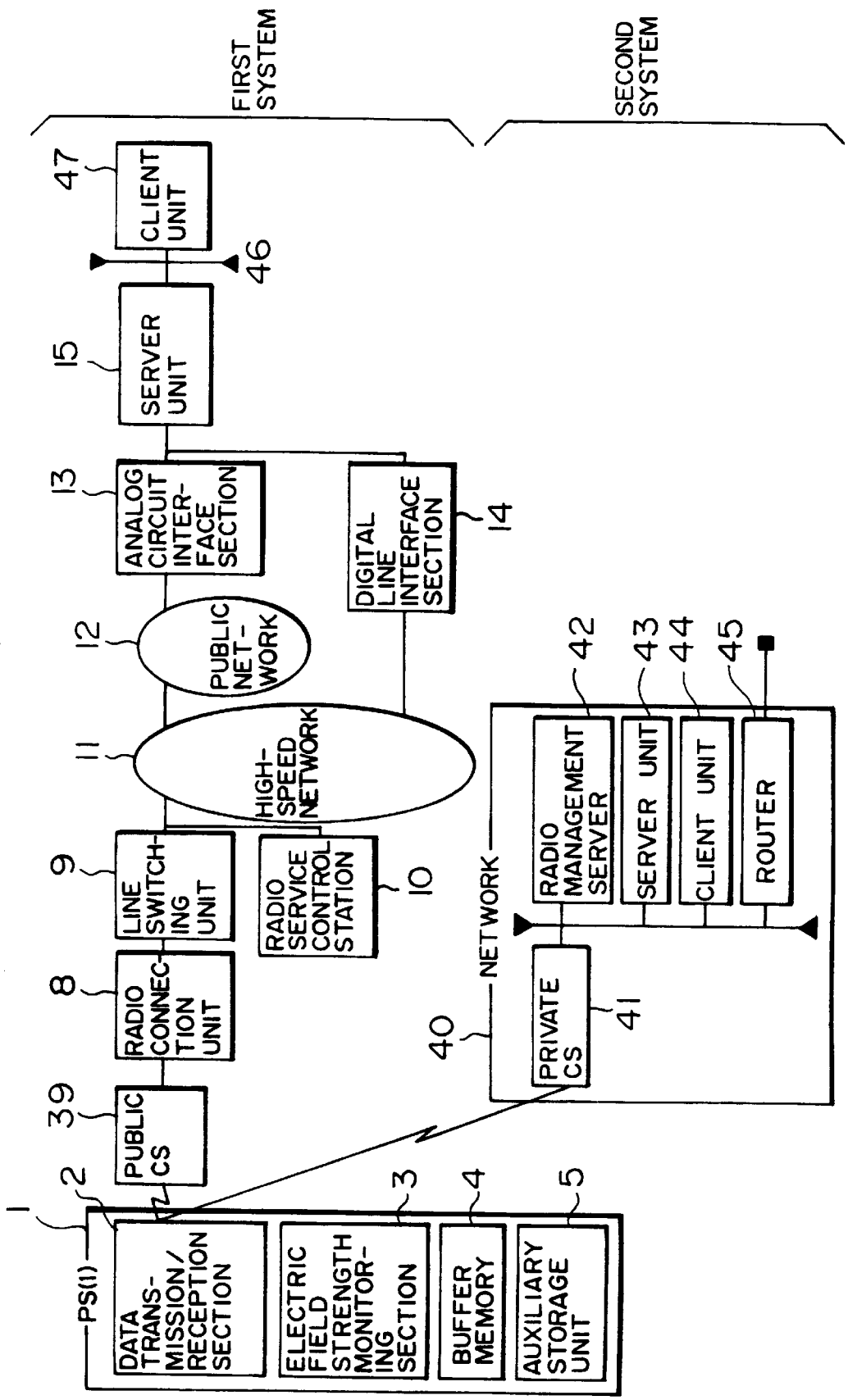

NETWORK SYSTEM FOR MOBILE RADIO COMMUNICATION WITH LINE SWITCHING

BACKGROUND OF THE INVENTION

1. Field of the Invention

The present invention relates to a network system for mobile radio communication in which a network system for mobile radio terminal is connected to a communication through a public or private radio base station to perform data communication with a server unit, and more particularly, to a network system for mobile radio communication which can prevent data losses even if slot errors or a drop in electric field strength occur between a mobile radio terminal and a public or private radio base station.

2. Description of the Prior Art

As shown in FIG. 1, a conventional network system for mobile radio communication is constituted by a radio connection unit 55 for selecting a line to be connected through a communication network 56, radio base stations 53 and 54 respectively installed in a plurality of unit cells, and a mobile radio terminal (to be referred to as a PS hereinafter) 48 which establishes a radio channel with a radio base station while moving. The PS 48 includes a buffer memory (to be referred to as a BM hereinafter) 50 for temporarily storing data in a line switching operation, a data device 51, a data processing apparatus 49, and a communication controller 52.

As a data transmission scheme in such a system, the scheme disclosed in Japanese Unexamined Patent Publication No. 59-212040 is available.

More specifically, when the radio base station (1) 53 determines the necessity for line switching during communication between the PS 48 and the radio base station (1) 53, the radio base station (1) 53 sends a line switching notification to the radio connection unit 55, and also sends a communication interruption notification to the data processing apparatus 49. Upon reception of the notification, the data processing apparatus 49 transmits an acknowledgement signal to the radio connection unit 55 and starts to store, in the BM 50, the communication data which has been directly transmitted. When the radio connection unit 55 receives the acknowledgement signal from the data processing apparatus 49, the communication between the PS 48 and the radio base station (1) 53 is interrupted. While the data processing apparatus 49 is storing the communication data, line switching processing is performed. When the radio base station (2) 54 to serve next is determined, the radio connection unit 55 sends a switching instruction to the radio base station (1) 53, that has been serving up until now, and the radio base station (2) 54 that is to serve next. Upon reception of the switching instruction, the radio base station (1) 53 as the currently serving station sends a switching instruction to the communication controller 52. When these operations are complete, the communication is resumed. When the communication is resumed, the data processing apparatus 49 reads out the data stored in the BM 50 and transmits the data to the radio base station (2) 54 through the communication controller 52. When all the data are read out from the BM 50, direct communication without the mediacy of the BM 50 is started again.

The following problems are posed in the above conventional data transmission scheme.

First, in data transmission between a server unit, which is assumed to be outside the area covered by a communication network, and a PS, the server unit that transmits/receives data to/from the PS has no BM for storing data. For this reason, if a hit occurs during data transmission from the server unit to the PS, data is lost.

Second, no consideration is given to a case wherein line disconnection cannot be avoided because of continuous slot errors or a continuous reduction in electric field strength. For this reason, data is lost when the line is disconnected.

Third, the radio base station must monitor the reception state of the PS so as to send a line switching instruction thereto. For this reason, line switching processing is complicated, resulting in a decrease in line switching speed.

SUMMARY OF THE INVENTION

The present invention has been made to solve the above problems in the conventional techniques, and has as its object to provide a network system for mobile radio communication in which a PS is connected to a public radio base station (to be referred to as a public CS hereinafter) or a private radio base station (to be referred to as a private CS hereinafter) to perform data communication with a server unit in a network, and which can prevent data losses even if slot errors or a reduction in electric field strength occur between a PS and the CS, thereby realizing highly reliable data transmission.

In order to achieve the above object, according to the first aspect of the present invention, there is provided a network system for mobile radio communication (which is referred to as a network system for mobile radio communication using a public CS hereinafter) comprising a network constituted by a server unit and a client unit, a radio connection unit connected to a communication network, a public CS installed in a cell, and a PS which establishes a radio channel with the public CS while moving, the network system being adapted to perform data communication between the server unit and the PS, wherein each of the server unit and the PS includes a BM and an auxiliary storage unit which hold data, and the PS includes an electric field strength monitoring section for monitoring slot errors or a reduction in an electric field strength, stores data in the BM during data transmission to the server unit when a level based on slot errors or a reduction in electric field strength is not lower than a threshold for line switching, sends a line switching notification to the server unit, sends a line switching request to the public CS, and starts to transmit the data stored in the BM upon reception of a response indicating completion of line switching from the public CS.

According to the second aspect of the present invention, similar to the first aspect, there is provided a network system for mobile radio communication using a public CS, in which a PS includes a section for instructing a server unit to store data in a BM during data reception from the server unit when an electric field strength monitoring section determines that a level based on slot errors or a reduction in electric field strength is not lower than a threshold for line switching, a section for sending a line switching request to the public CS, and a section for notifying the server unit of completion of line switching upon reception of a response indicating completion of line switching from the public CS, and the server unit includes a section for starting to transmit the data stored in a BM.

According to the third aspect of the present invention, similar to the first aspect, there is provided a network system for mobile radio communication using a public CS, in which a PS includes a section for sending a server unit a notification indicating that preparation for line disconnection is in progress during data reception from the server unit when a level based on slot errors or a reduction in electric field strength is not lower than a threshold for line disconnection, a section for starting a timer, and a section for notifying the server unit of recovery of the electric field strength when the electric field strength is recovered within a disconnection determination time, and the server unit includes a section for storing data in a BM upon reception of the notification indicating that preparation for line disconnection is in progress from the PS, and a section for starting to transmit the data stored in a BM upon reception of a notification indicating that the electric field strength is recovered.

According to the fourth aspect of the present invention, similar to the first aspect, there is provided a network system for mobile radio communication using a public CS, in which a PS includes a section for storing data in a BM during data transmission to a server unit when an electric field strength monitoring section determines that a level based on slot errors or a reduction in electric field strength is not lower than a threshold for line disconnection, a section for starting a timer, and a section for starting the data stored in a BM when the electric field strength is recovered within a predetermined disconnection determination time.

According to the fifth aspect of the present invention, in the network system for mobile radio communication according to the fourth aspect, when the electric field strength is not recovered within the disconnection determination time, the PS can output a line disconnection request to the public CS and can perform termination processing in preparation for power off of the PS upon completion of line disconnection.

According to the sixth aspect of the present invention, there is provided a network system for mobile radio communication which is referred to as a network system for mobile radio communication using a private CS hereinafter) comprising a private network constituted by a radio management server, a server unit, and a client unit, a private CS installed in a cell, and a PS which establishes a radio channel with the private CS while moving, the system being adapted to perform data communication between the server unit and the PS, each of the server unit and the PS including a BM and an auxiliary storage unit which hold data, and the PS including an electric field strength monitoring section for monitoring slot errors or a reduction in electric field strength, a section for storing data in the BM during data transmission to the server unit when a level based on slot errors or a reduction in electric field strength is not lower than a threshold for line switching, a section for sending a line switching notification to the server unit, a section for sending a line switching request to the private CS, and a section for starting to transmit the data stored in the BM upon reception of a response indicating completion of line switching from the private CS.

According to the seventh aspect of the present invention, similar to the sixth aspect, there is provided a network system for mobile radio communication using a private CS, in which a PS includes a section for instructing a server unit to store data in a BM during data reception from the server unit when an electric field strength monitoring section determines that a level based on slot errors or a reduction in electric field strength is not lower than a threshold for line switching, a section for sending a line switching request to the private CS, and a section for notifying the server unit of completion of line switching upon reception of a response indicating completion of line switching from the private CS, and the server unit includes a section for changing a private CS destination ID of the data stored in a BM to a private CS destination ID after line switching, and a section for starting to transmit the stored data.

According to the eighth aspect of the present invention, similar to the sixth aspect, there is provided a network system for mobile radio communication using a private CS, in which a PS includes a section for notifying a server unit that preparation for line disconnection is in progress during data reception from the server unit when an electric field strength monitoring section determines that a level based on slot errors or a reduction in electric field strength is not lower than a threshold for line switching, a section for starting a timer, and a section for notifying the server unit of recovery of the electric field strength when the electric field strength is recovered within a disconnection determination time, and the server unit includes a section for storing data in a BM upon reception of a notification indicating that preparation for line disconnection is in progress from the PS, and a section for starting to transmit the data stored in the BM upon reception of a notification indicating that the electric field strength is recovered.

According to the ninth aspect of the present invention, similar to the sixth aspect, there is provided a network system for mobile radio communication using a private CS, in which a PS includes a section for storing data in a BM during data transmission to a server unit when an electric field strength monitoring section determines that a level based on slot errors or a reduction in electric field strength is not lower than a threshold for line disconnection, a section for starting a timer, and a section for starting to transmit the data stored in a BM when the electric field strength is recovered within a predetermined disconnection determination time.

According to the 10th aspect of the present invention, in the network system for mobile radio communication of the ninth aspect, the PS can output a line disconnection request to the public CS when the electric field strength is not recovered within the disconnection determination time, and can perform termination processing in preparation for power off of the PS upon completion of line disconnection.

According to the 11th embodiment of the present invention, there is provided a network system for mobile radio communication comprising both a mobile radio network system using a public CS and a mobile radio network system using a private CS, in which a PS includes a section for switching connection to the public CS or the private CS.

According to the present invention having the above aspects, in a system in which a PS is connected to a radio base station to perform data communication with a server unit in a network, even if slot errors or a reduction in electric field strength occurs between the PS and the radio base station, data losses can be prevented, and highly reliable data transmission can be realized.

The above and many other objects, features and advantages of the present invention will become manifest to those skilled in the art upon making reference to the following detailed description and accompanying drawings in which preferred embodiments incorporating the principles of the present invention are shown by way of illustrative example.

BRIEF DESCRIPTION OF THE DRAWINGS

FIG. 14 is a block diagram showing the overall arrangement of the third system of the present invention.

DETAILED DESCRIPTION OF THE PREFERRED EMBODIMENTS

Several preferred embodiments of the present invention will be described below with reference to the accompanying drawings (FIGS. 2 to 14).

Figure 1:
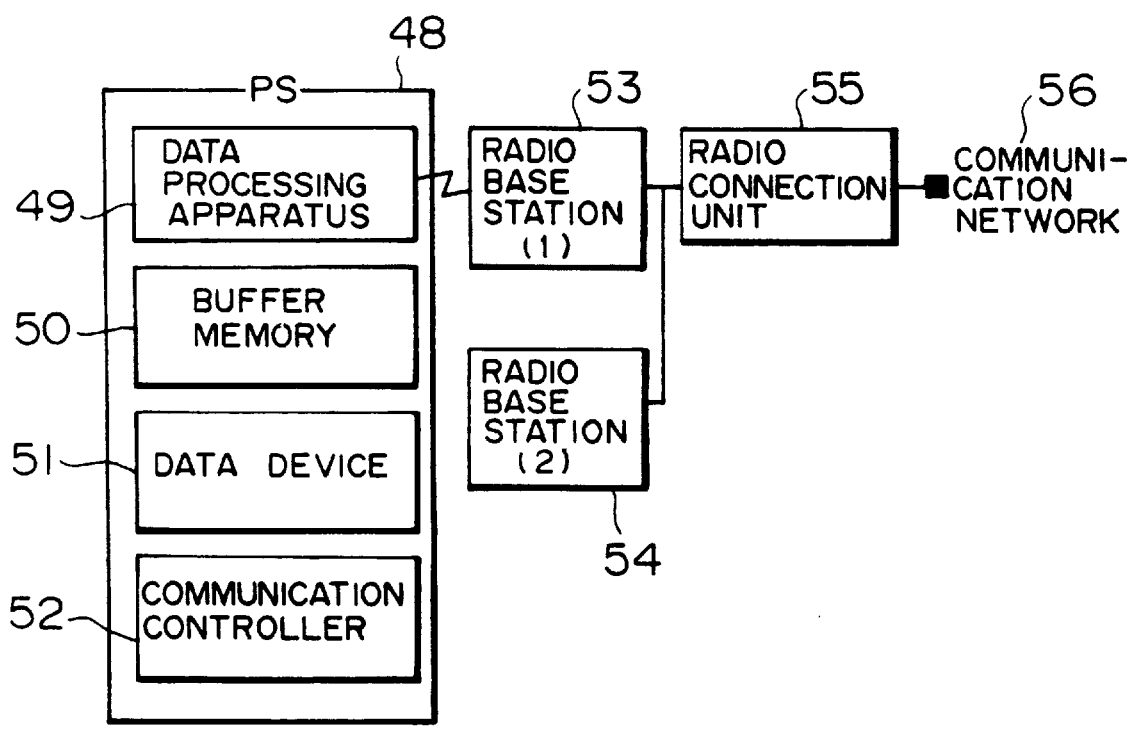
FIG. 1 is a block diagram showing the overall arrangement of a conventional network system for mobile radio communication.
Figure 2:
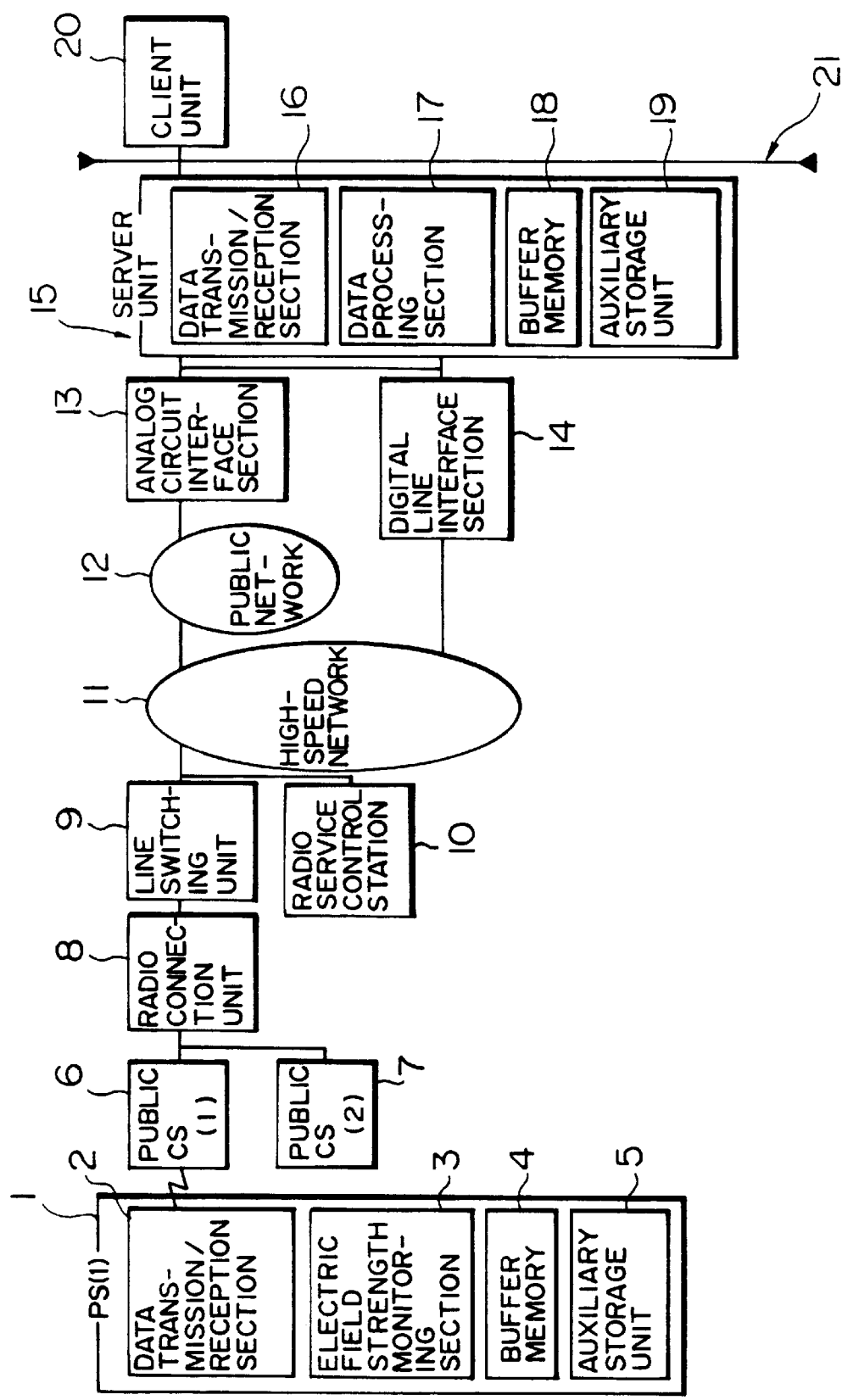
FIG. 2 is a block diagram showing the overall arrangement of the first system of the present invention.
Figure 3:
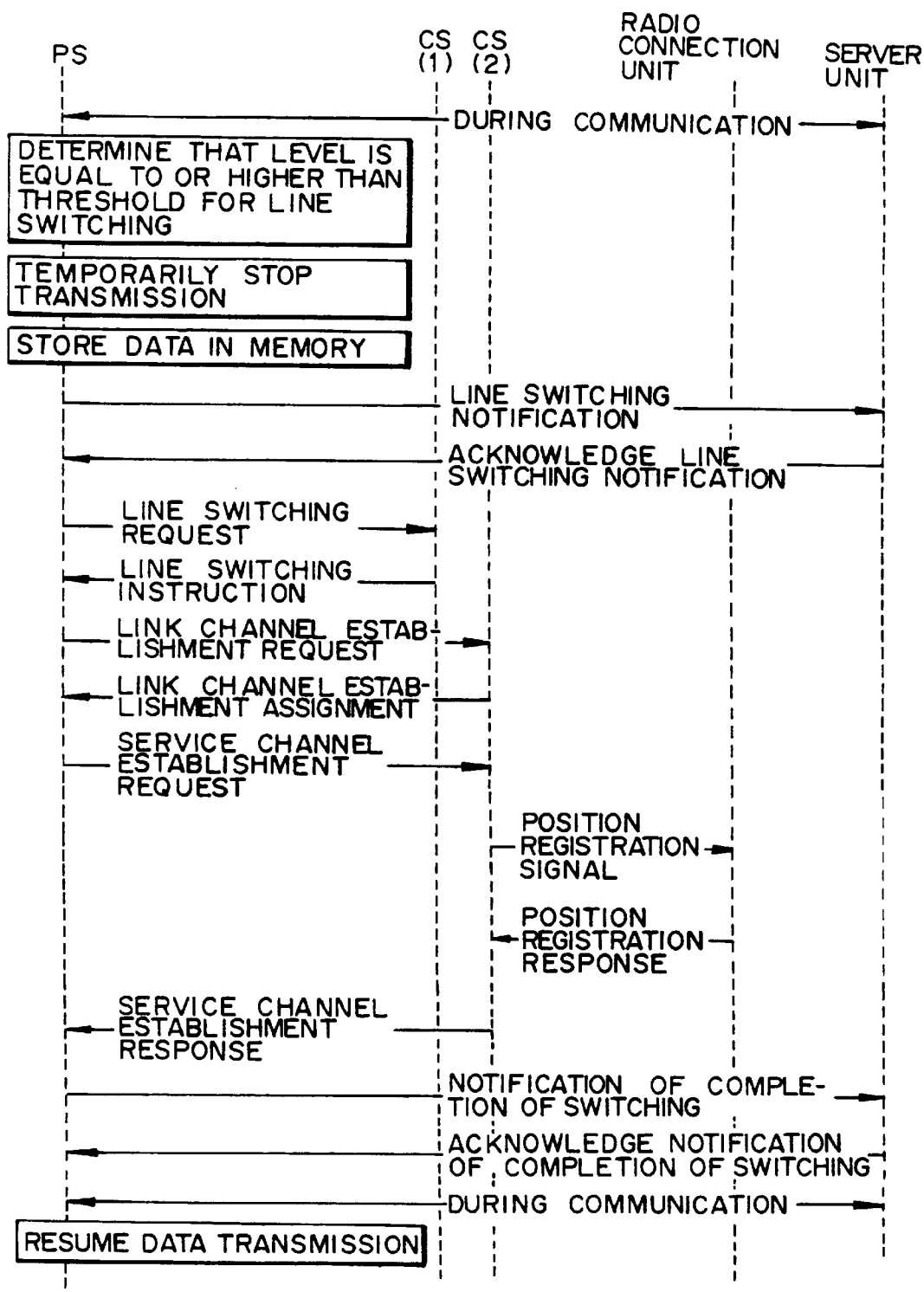
FIG. 3 is a flow chart showing a procedure as the first mode of the first system of the present invention.
Figure 4:
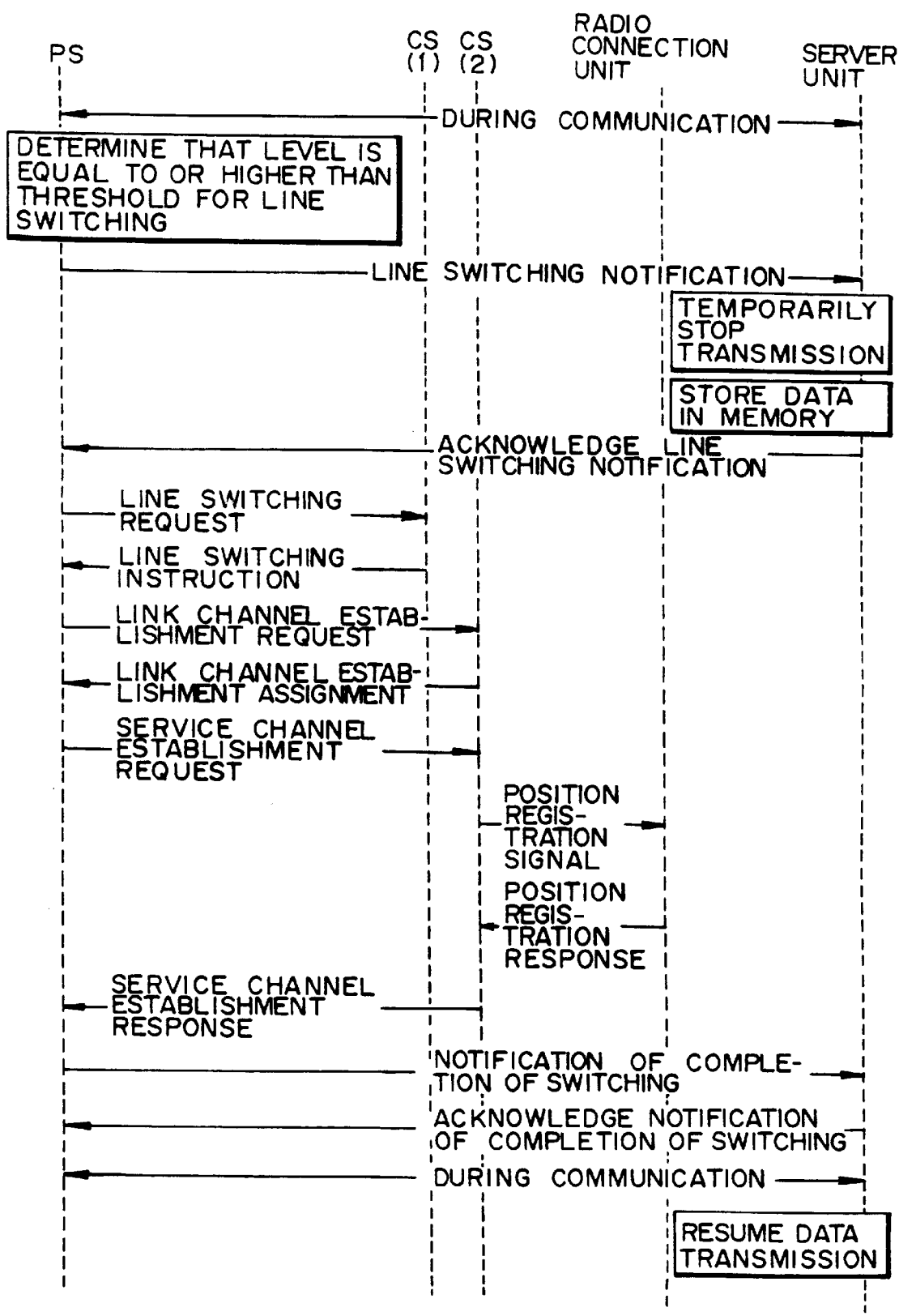
FIG. 4 is a flow chart showing a procedure as the second mode of the first system of the present invention.
Figure 5:
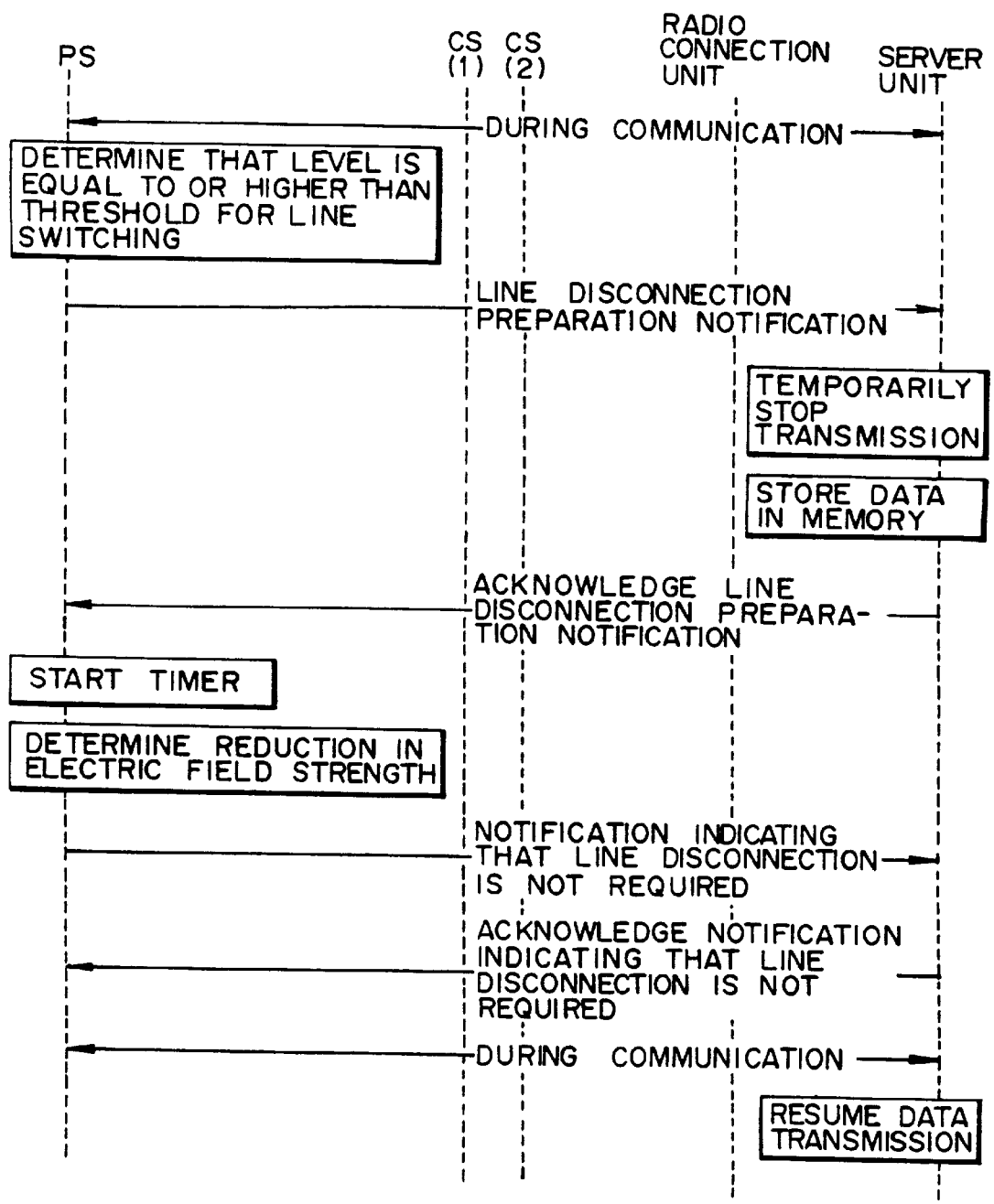
FIG. 5 is a flow chart showing a procedure as the third mode of the first system of the present invention.
Figure 6:
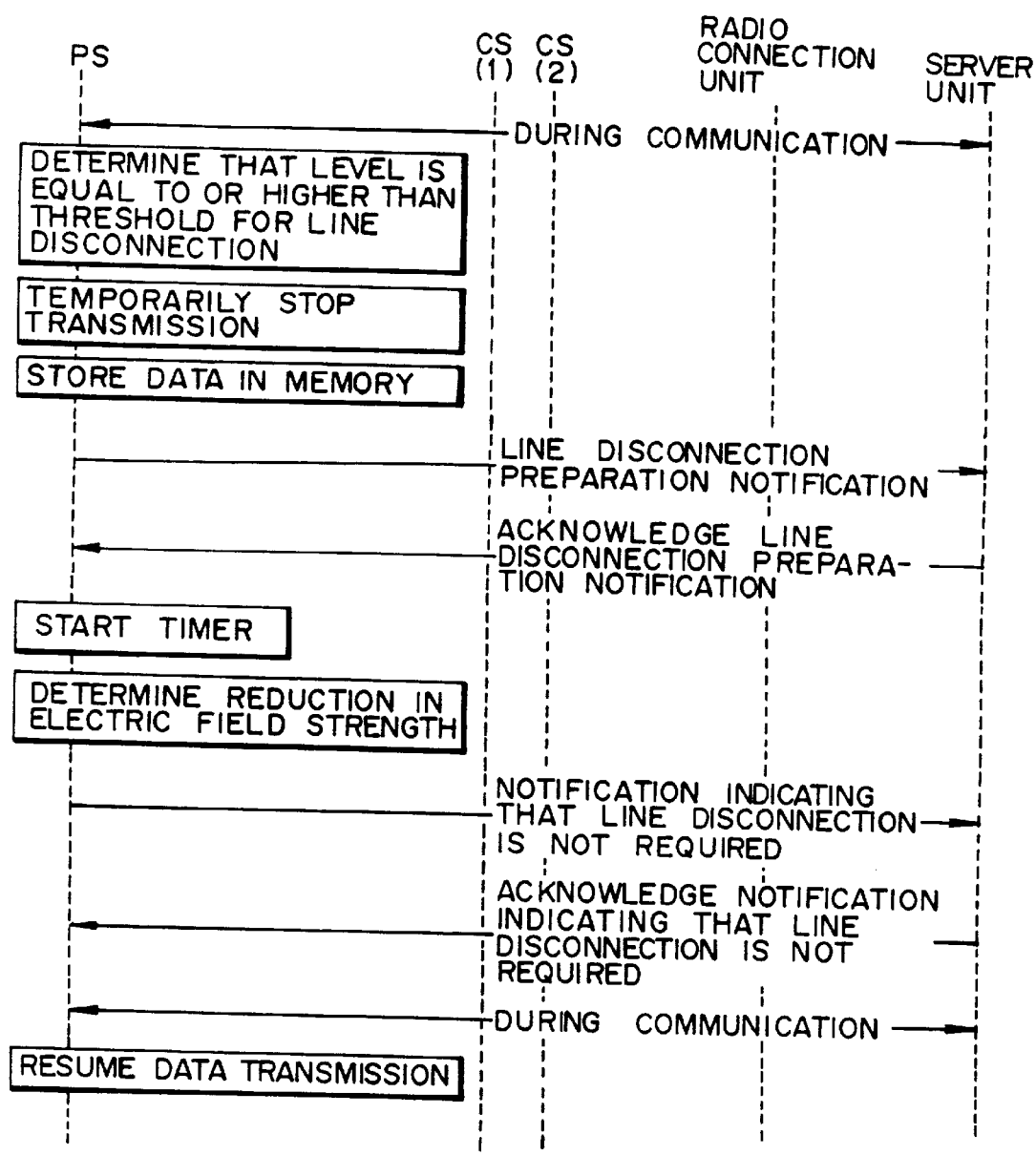
FIG. 6 is a flow chart showing a procedure as the fourth mode of the first system of the present invention.

FIG. 2 is a block diagram showing the overall arrangement of the first system of the present invention. A network system for mobile radio communication will be described below. Assume that a slot error or a reduction in electric field strength occurs between a PS and a public CS during a wide-area information service in which, for example, the user transmits/receives data, outside the office, to/from a server unit connected to a network such as an office LAN through a high-speed network such as an ISDN or a public network such as a telephone line. The first system comprises a network 21 constituted by a server unit 15 and a client unit 20, a line switching unit 9 to which the network 21 is connected through a digital line interface section 14 and a high-speed network 11 or through an analog circuit interface section 13, a public network 12, and the high-speed network 11, a radio connection unit 8 for generating position information on the basis of a PS position registration request from a public CS (1) 6 or a public CS (2) 7, a radio service control station 10 for recording the position information, and a group of unit cells. Each unit cell comprises the public CS (1) 6 or the public CS (2) 7 and a PS 1 which establishes a channel with the public CS (1) 6 or the public CS (2) 7 in the unit cell while moving.

In the above system, the PS 1 has a means of requesting the public CS (1) 6 to perform line switching and disconnection. The PS 1 includes a data transmission/reception section 2 for transmitting/receiving data, an electric field strength monitoring section 3 for monitoring a slot error or a reduction in electric field strength, a BM 4 for temporarily storing data to be communicated, and an auxiliary storage unit 5 for saving data. The server unit 15 includes a data processing section 17 for analyzing a request from the PS 1 and processing necessary data, a data transmission/reception section 16 for transmitting/receiving data, a BM 18 for temporarily storing data to be communicated, and an auxiliary storage unit 19. The digital line interface section 14 provides the interface between the high-speed network 11 and the server unit 15. The analog circuit interface section 13 provides the interface between the public network 12 and the server unit 15. As the digital line interface section 14, an assembly of a terminal adaptor, a line controller, and an ISDN board is available. As the analog circuit interface section 13, a modem is available. Note that the above interface sections can be replaced with other interface devices in accordance with an increase in the communication speed of a line.

Assume that in a 4-channel multiplex multi-carrier TDMA (Time Division Multiple Access)/TDD (Time Division Duplex), a digital signal on one radio carrier is divided into frames at 5-ms intervals, and each frame is further divided into eight slots, and that a slot error indicates a state wherein data transmitted from a home station in a given slot cannot be received by a distant station.

Assume also that the thresholds for line switching and line disconnection are specified in advance between the PS and the radio base station, and both the level obtained by monitoring a reduction in electric field strength instead of slot errors and the level based on a combination of monitoring operations for slot errors and a reduction in electric field strength can be compared with the above thresholds. Since a method of monitoring slot errors and a reduction in electric field strength is a known technique in the radio communication schemes, and is not a constituent element of the present invention, a description thereof will be omitted.

Assume that in the above arrangement, the level based on slot errors or a reduction in electric field strength is equal to or higher than the threshold for line switching, and data is to be transmitted to the server unit. The procedure required between the PS, the public CS, and the server unit in this case will be described as the first mode of the first system with reference to FIG. 3.

When the electric field strength monitoring section 3 of the PS 1 determines that the level based on slot errors or a reduction in electric field strength is equal to or higher than the threshold for line switching, the data transmission/reception section 2 temporarily stops the transmission, and stores, in the BM 4, the data which cannot be transmitted. The data transmission/reception section 2 then sends a line switching notification to the server unit 15. Upon reception of an acknowledgement from the server unit 15, the data transmission/reception section 2 requests the public CS (1) 6 to perform line switching.

Upon reception of the line switching instruction from the public CS (1) 6, the PS 1 sends the public CS (2) 7 a request for establishing a channel for transferring information required to connect the radio base station and the PS (to be referred to as a link line establishment request hereinafter). When the link line is established, the PS 1 sends the public CS (2) 7 a request for establishing a channel used to transmit/receive data (to be referred to as a service channel establishment request hereinafter). Upon reception of the request, the public CS (2) 7 sends a position registration signal to the radio connection unit 8. The signal is then registered in the radio service control station 10 through the radio connection unit 8 and the line switching unit 9. Upon reception of a response signal indicating the completion of line switching from the public CS (2) 7, the PS 1 notifies the server unit 15 of the completion of line switching. Upon reception of an acknowledgement from the server unit 15, the PS 1 starts to transmit the data stored in the BM 4.

Assume that the level based on slot errors or a reduction in electric field strength is equal to or higher than the threshold for line switching, and data is to be received from the server unit. The procedure required between the PS, the public CS, and the server unit in this case will be described as the second mode of the first system with reference to FIG. 4.

When the electric field strength monitoring section 3 of the PS 1 determines that the level based on slot errors or a reduction electric field strength is equal to or higher than the threshold for line switching, the PS 1 sends a line switching notification to the server unit 15. In the server unit 15, the data transmission/reception section 16 temporarily stops the transmission, stores, in the BM 18, the data which cannot be transmitted, and sends the PS 1 an acknowledgement to the line switching notification. Upon reception of the acknowledgement, the PS 1 sends a line switching request to the public CS (1) 6.

Upon reception of a line switching instruction from the public CS (1) 6, the PS 1 sends a link channel establishment request to the public CS (2) 7. When a link channel is established, the PS 1 sends a service channel establishment request to the public CS (2) 7. Upon reception of the request, the public CS (2) 7 sends a position registration signal to the radio connection unit 8. The signal is then registered in the radio service control station 10 through the radio connection unit 8 and the line switching unit 9. Upon reception of a response indicating the completion of line switching from the public CS (2) 7, the PS 1 notifies the server unit 15 of the completion of line switching. The server unit 15 sends an acknowledgement to the PS 1 and starts to transmit the data stored in the BM 18.

Assume that the level based on slot errors or a reduction in electric field strength is equal to or higher than the threshold for line switching, and data is to be received from the server unit. The procedure required between the PS, the public CS, and the server unit in this case will be described as the third mode of the first system with reference to FIG. 5.

When the electric field strength monitoring section 3 determines that the level based on slot errors or a reduction in electric field strength is equal to or higher than the threshold for line disconnection, the PS 1 sends a line disconnection preparation notification to the server unit 15. In the server unit 15, the data transmission/reception section 16 temporarily stops the transmission, stores, in the BM 18, the data which cannot be transmitted, and sends an acknowledgement to the PS 1. Upon reception of the acknowledgement, the PS 1 starts the timer and checks whether the electric field strength is recovered within a predetermined disconnection determination time. If the electric field strength is recovered within the predetermined disconnection determination time, the PS 1 notifies the server unit 15 that line disconnection is not required. The server unit 15 then sends an acknowledgement to the PS 1, and starts to transmit the data stored in the BM 18.

Assume that the level based on slot errors or a reduction in electric field strength is equal to or higher than the threshold for line switching, and data is to be transmitted to the server unit. The procedure required between the PS, the public CS, and the server unit in this case will be described as the fourth mode of the first system with reference to FIG. 6.

When the electric field strength monitoring section 3 of the PS 1 determines that the level based on slot errors or a reduction in electric field strength is equal to or higher than the threshold for line disconnection, the data transmission/reception section 2 temporarily stops the transmission, stores, in the BM 4, the data which cannot be transmitted, and sends a line disconnection preparation notification to the server unit 15. Upon reception of an acknowledgement from the server unit 15, the PS 1 starts the timer, and checks whether the electric field strength is recovered within a predetermined disconnection determination time. If the electric field strength is recovered within the disconnection determination time, the PS 1 notifies the server unit 15 that line disconnection is not required. Upon reception of an acknowledgement from the server unit 15, the PS 1 starts to transmit the data stored in the BM 4.

Figure 7:
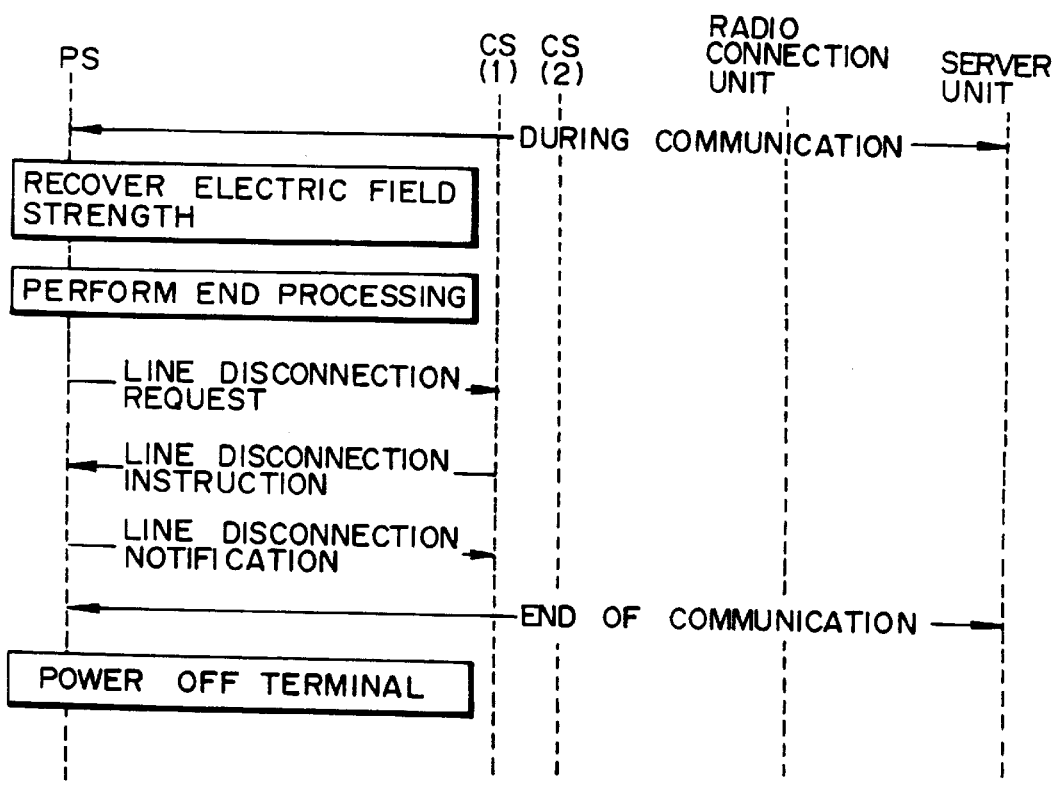
FIG. 7 is a flow chart showing a procedure as the fifth mode of the first system of the present invention.

The procedure required between the PS, the public CS, and the server unit when the electric field strength is not recovered within the predetermined determination time in the fourth mode will be described below as the fifth mode of the first system with reference to FIG. 7.

If the electric field strength is not recovered within the disconnection determination time, the data stored in the BM 4 and information indicating the current operation state are saved in the auxiliary storage unit 5. The PS 1 sends a line disconnection request to the public CS (1) 6. Upon reception of a line disconnection instruction from the public CS (1) 6, the PS 1 disconnects the line, and notifies the public CS (1) 6 that the line is disconnected. The PS 1 is then powered off. When the PS 1 is powered on again, the operation state indicated by the information saved in the auxiliary storage unit 5 is restored. When the electric field strength is recovered, the PS 1 retransmits the data saved in the auxiliary storage unit 5.

Figure 8:
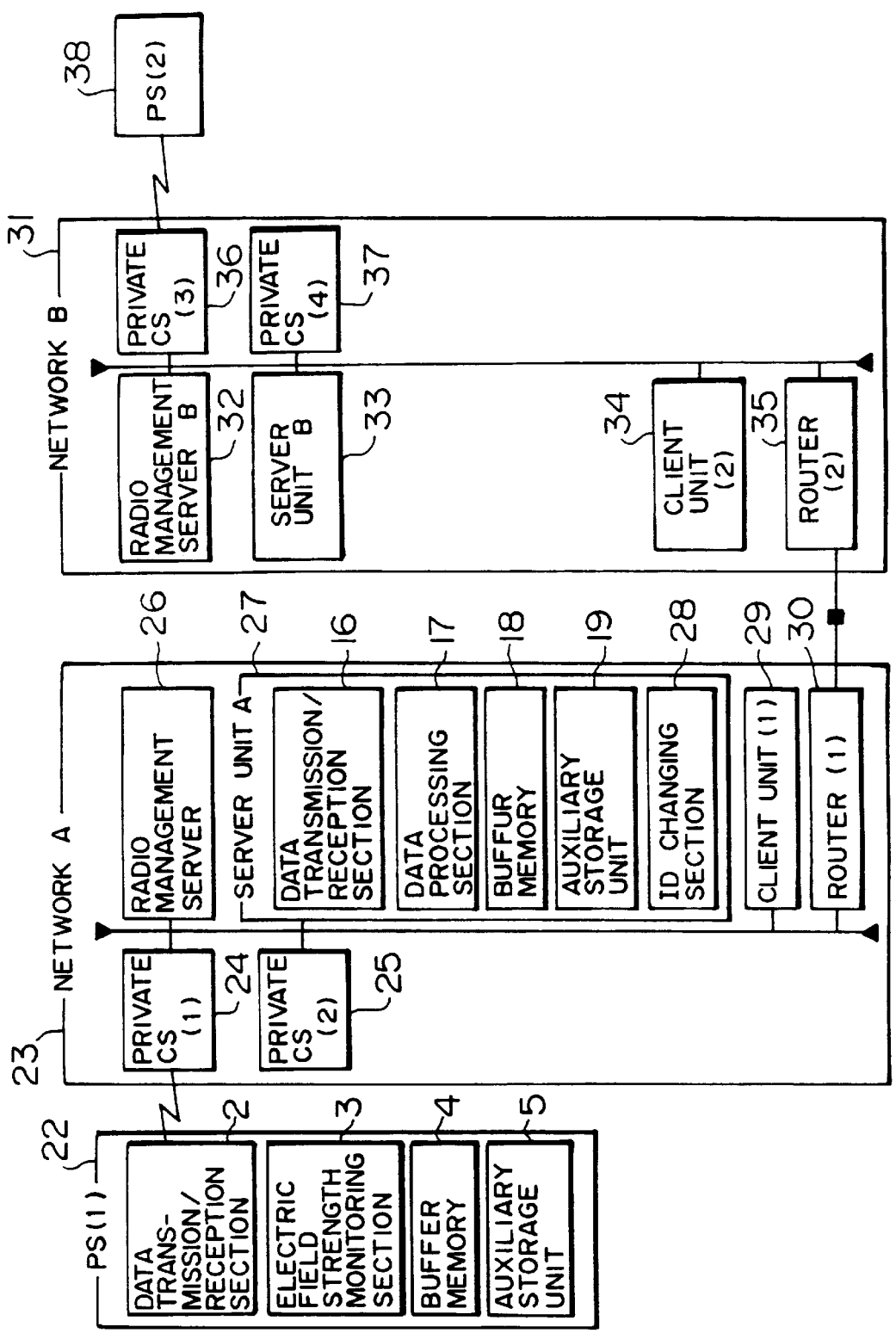
FIG. 8 is a block diagram showing the overall arrangement of the second system of the present invention.
Figure 9:
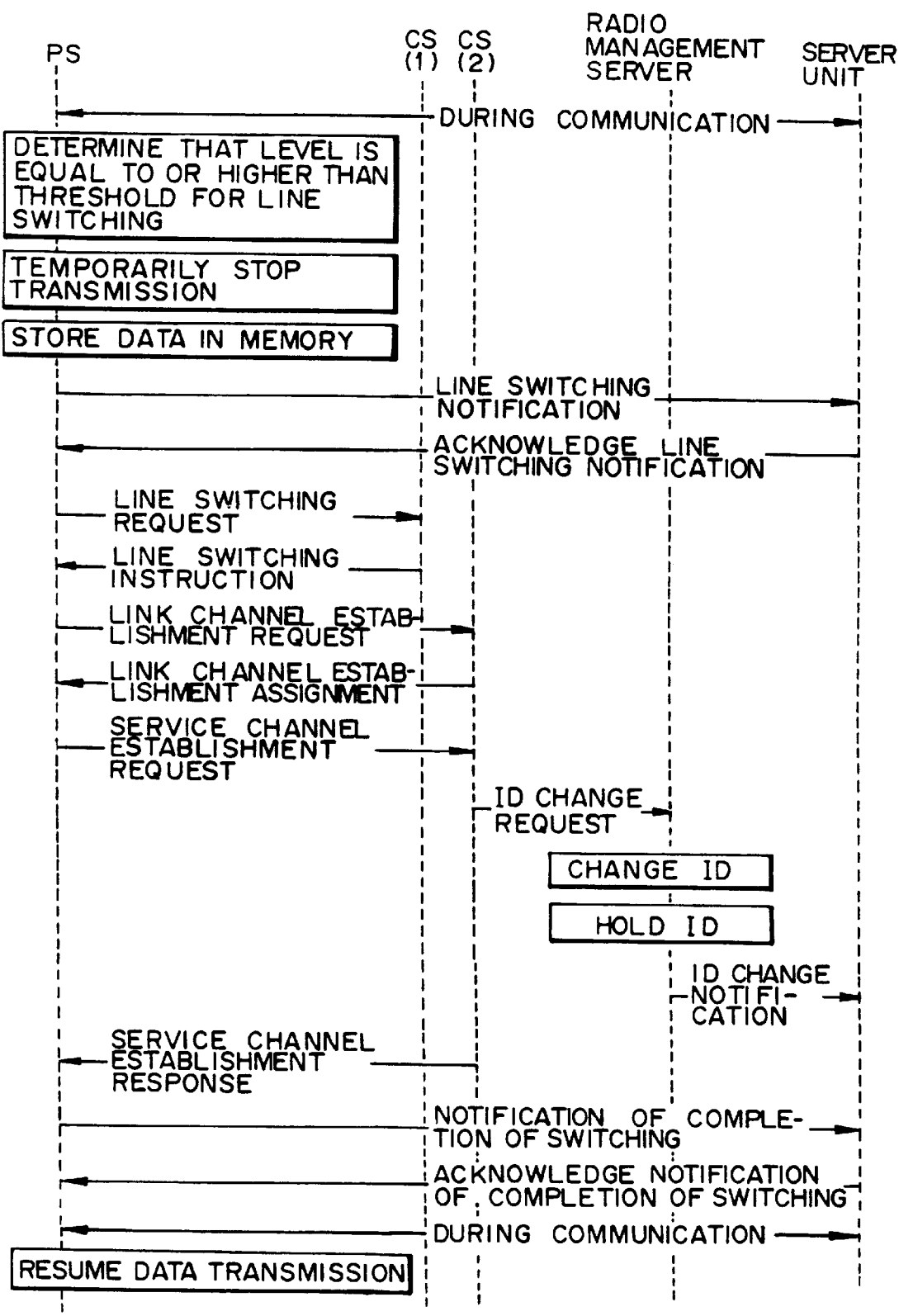
FIG. 9 is a flow chart showing a procedure as the first mode of the second system of the present invention.
Figure 10:
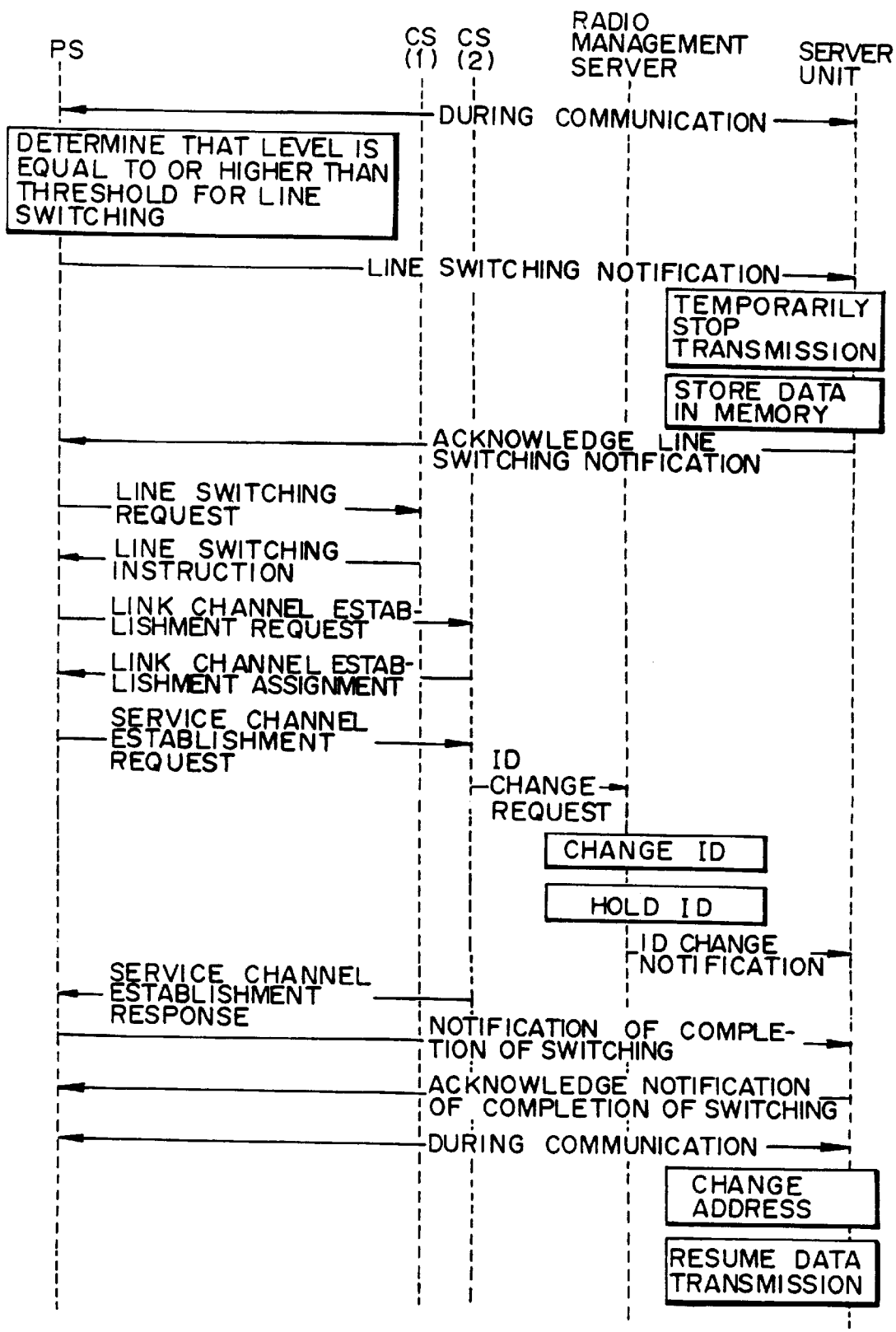
FIG. 10 is a flow chart showing a procedure as the second mode of the second system of the present invention.
Figure 11:
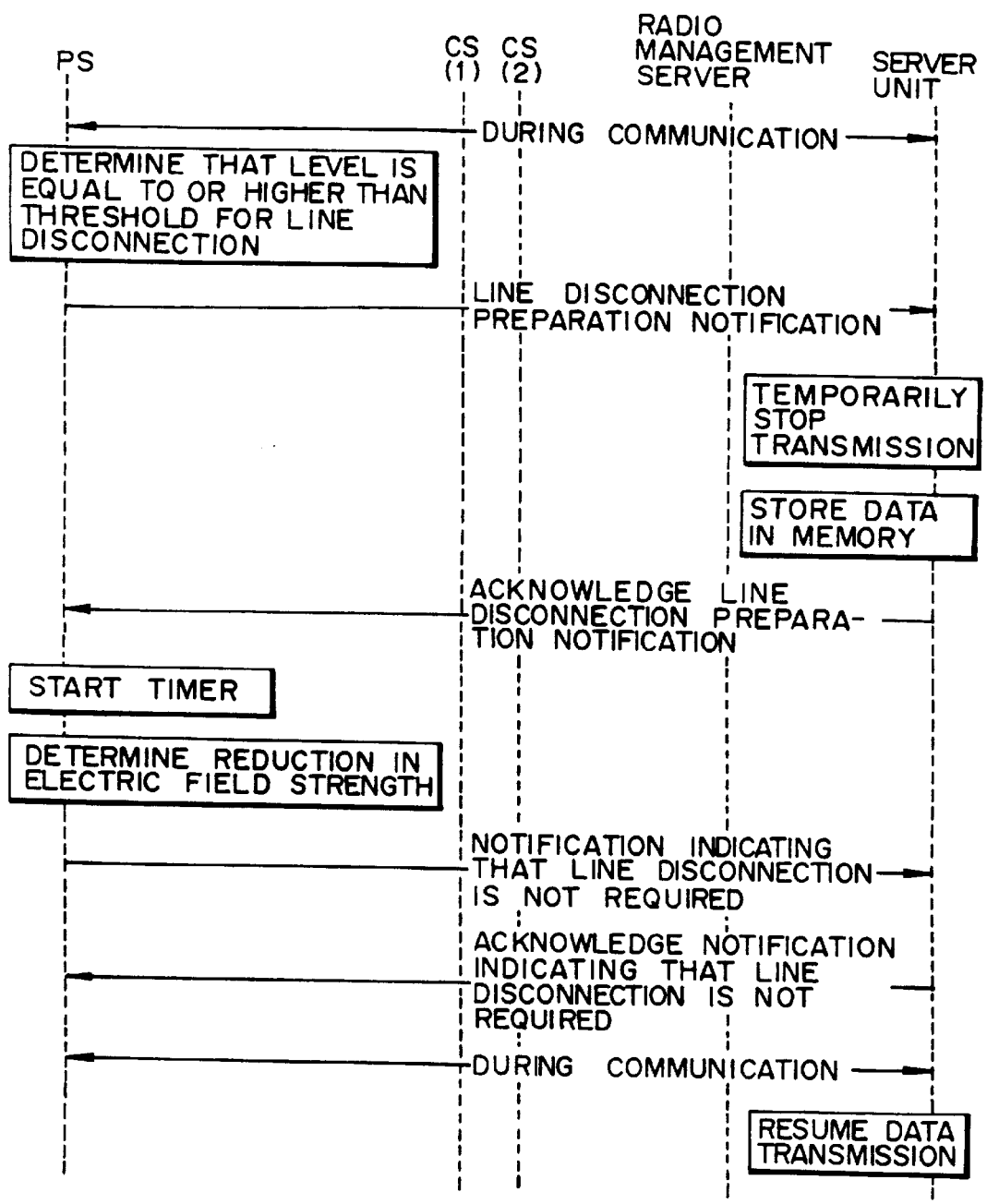
FIG. 11 is a flow chart showing a procedure as the third mode of the second system of the present invention.
Figure 12:
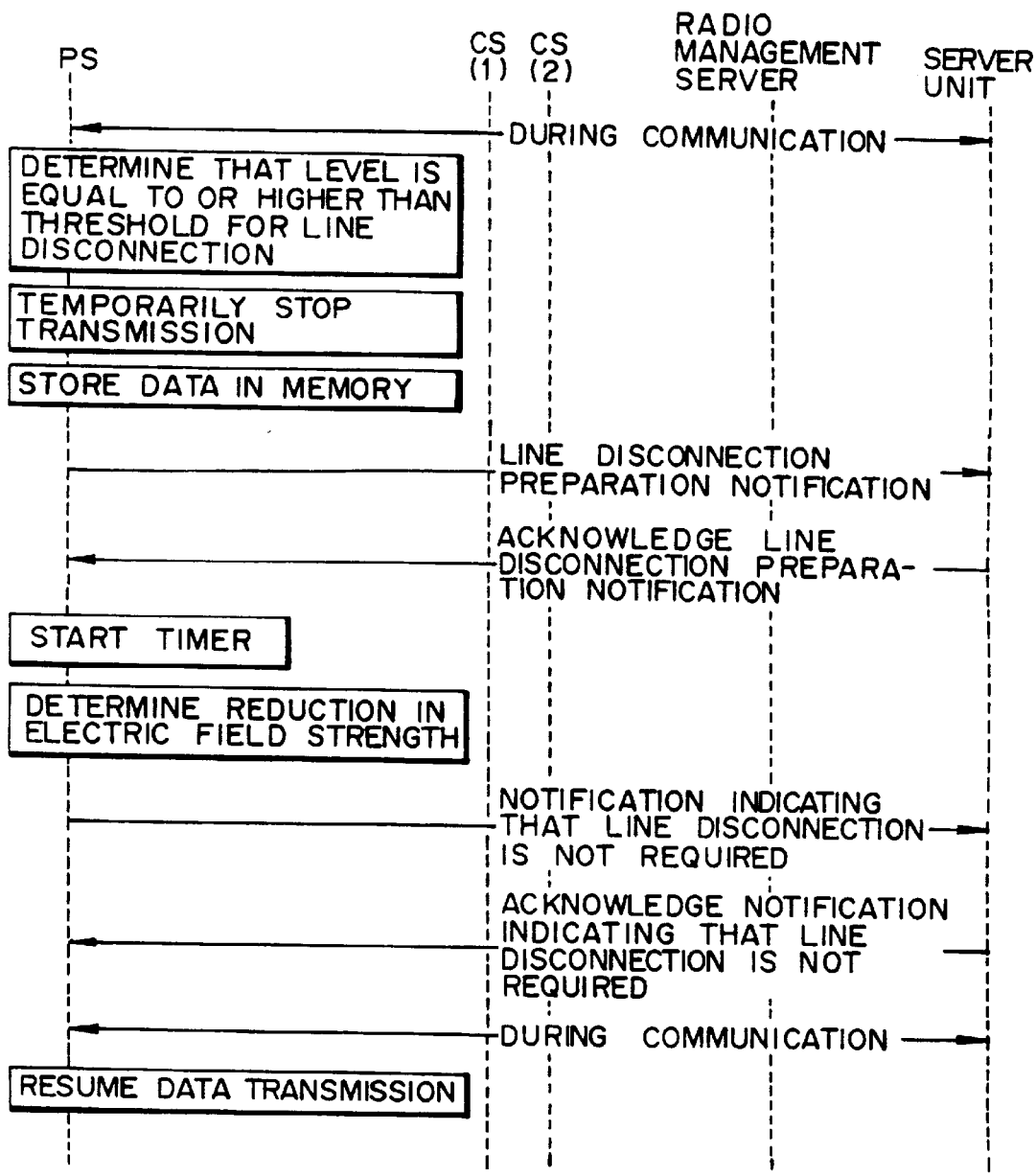
FIG. 12 is a flow chart showing a procedure as the fourth mode of the second system of the present invention.

FIG. 8 is a block diagram showing the overall arrangement of the second system of the present invention. A network system for mobile radio communication will be described below. Assume that a slot error or a reduction in electric field strength occurs between a PS and a private CS during a local information service system or the like in which, for example, data is transmitted/received to/from a server unit connected to a network in facilities such as an amusement park without the mediacy of a line.

The second system comprises a network A23 constituted by a radio management server A26, a group of unit cells, a server unit A27, and a client unit (1) 29, and a network B31 constituted by a radio management server B32, a group of unit cells, a server unit B33, and a client unit (2) 34. Each unit cell is constituted by a private CS (1) 24 and a CS (2) 25, or a CS (3) 36 and a CS (4) 37, and a PS (1) 22 or a PS (2) 38 which establishes a channel with a private CS in the unit cell while moving.

The PS (1) 22 or the PS (2) 38 has a means of requesting a private CS to perform line switching and disconnection. Each PS includes a data transmission/reception section 2 for transmitting/receiving data, an electric field strength monitoring section 3 for monitoring slot errors or a reduction in electric field strength due to interference, a BM 4 for temporarily storing data to be communicated, and an auxiliary storage unit 5 for saving data. Each of the server units 27 and 33 includes a data processing section 17 for analyzing a request from a corresponding one of the PS (1) 22 and the PS (2) 38, and processing necessary data, a data transmission/reception section 16 for transmitting/receiving data, a BM 18 for temporarily storing data to be communicated, an auxiliary storage unit 19, and an ID changing section 28.

Assume that in the above system, the address of the PS is registered in the radio management server in advance, and the radio management server can transmit data to the PS by changing the destination of the data on the basis of the address.

Assume that in the above arrangement, the level based on slot errors or a reduction in electric field strength is equal to or higher than a threshold for line switching, and data is to be transmitted to the server unit. The procedure required between the PS, the private CS, and the server unit in this case will be described below as the first mode of the second system with reference to FIG. 9.

When the electric field strength monitoring section 3 of the PS (1) 22 determines that the level based on slot errors or a reduction in electric field strength is equal to or higher than the threshold for line switching, the data transmission/reception section 2 temporarily stops the transmission, stores, in the BM 4, the data which cannot be transmitted, and sends a line switching notification to the server unit A27. Upon reception of an acknowledgement from the server unit A27, the PS (1) 22 sends a line switching request to the private CS (1) 24.

Upon reception of a line switching instruction from the private CS (1) 24, the PS (1) 22 sends a link channel establishment request to the private CS (2) 25. When a link channel is established, the PS (1) 22 sends a service channel establishment request to the private CS (2) 25. Upon reception of the request, the private CS (2) 25 requests the radio management server A26 to change the ID of the PS (1) 22. Upon reception of the request, the radio management server A26 changes the ID of the PS (1) 22, holds the ID data, and notifies the server unit A27 that the ID has been changed. Upon reception of a response indicating the completion of line switching from the private CS (2) 25, the PS (1) 22 notifies the server unit A27 of the completion of line switching. Upon reception of an acknowledgement from the server unit A27, the PS (1) 22 starts to transmit the data stored in the BM 4.

Assume that the level based on slot errors or a reduction in electric field strength is equal to or higher than a threshold for line switching, and data is to be received from the server unit. The procedure required between the PS, the private CS, and the server unit in this case will be described below as the second mode of the second system with reference to FIG. 10.

When the electric field strength monitoring section 3 determines that the level based on slot errors or a reduction in electric field strength is equal to or higher than the threshold for line switching, the PS (1) 22 sends a line switching notification to the server unit A27. In the server unit A27, the data transmission/reception section 16 temporarily stops the transmission, stores, in the BM 18, the data which cannot be transmitted, and sends the PS (1) 22 an acknowledgement to the line switching notification.

Upon reception of the acknowledgement, the PS (1) 22 sends a line switching request to the private CS (1) 24. Upon reception of a line switching instruction from the private CS (1) 24, the PS (1) 22 sends a link channel establishment request to the private CS (2) 25. When a link channel is established, the PS (1) 22 sends a service channel establishment request to the private CS (2) 25.

Upon reception of the request, the private CS (2) 25 requests the radio management server A26 to change the ID of the PS (1) 22. Upon reception of the request, the radio management server A26 changes the ID of the PS (1) 22, and holds the ID data. At the same time, the radio management server A26 notifies the server unit A27 that the ID is changed. Upon reception of a response indicating the completion of line switching from the private CS (2) 25, the PS (1) 22 notifies the server unit A27 of the completion of line switching. The server unit A27 sends an acknowledgement to the PS (1) 22. The ID changing section 28 then changes the destination of the data stored in the BM 18, and starts to transmit the data.

Assume that the level based on slot errors or a reduction in electric field strength is equal to or higher than a threshold for line disconnection, and data is to be received from the server unit. The procedure required between the PS, the private CS, and the server unit in this case will be described below as the third mode of the second system with reference to FIG. 11.

When the electric field strength monitoring section 3 of the PS (1) 22 determines that the level based on slot errors or a reduction in electric field strength is equal to or higher than the threshold for line switching, the PS (1) 22 sends a line switching preparation notification to the server unit A27. In the server unit A27, the data transmission/reception section 16 temporarily stops the transmission, stores, in the BM 18, the data which cannot be transmitted, and sends an acknowledgement to the PS (1) 22. Upon reception of the acknowledgement, the PS (1) 22 starts a timer, and checks whether the electric field strength is recovered within a predetermined disconnection determination time. If the electric field strength is recovered within the disconnection determination time, the PS (1) 22 notifies the server unit A27 that line disconnection is not required. The server unit A27 sends an acknowledgement to the PS (1) 22, and starts to transmit the data stored in the BM 18.

Assume that the level based on slot errors or a reduction in electric field strength is equal to or higher than a threshold for line disconnection, and data is to be transmitted to the server unit. The procedure required between the PS, the private CS, and the server unit in this case will be described below as the fourth mode of the second system with reference to FIG. 12.

When the electric field strength monitoring section 3 of the PS (1) 22 determines that the level based on slot errors or a reduction in electric field strength is equal to or higher than the threshold for line disconnection, the data transmission/reception section 2 temporarily stops the transmission, stores, in the BM 4, the data which cannot be transmitted, and sends a line disconnection notification to the server unit A27. Upon reception of an acknowledgement from the server unit A27, the PS (1) 22 starts the timer, and checks whether the electric field strength is recovered within a predetermined disconnection determination time. If the electric field strength is recovered within the disconnection determination time, the PS (1) 22 notifies the server unit A27 that line disconnection is not required. Upon reception of an acknowledgement from the server unit A27, the PS (1) 22 starts to transmit the data stored in the BM 4.

Figure 13:
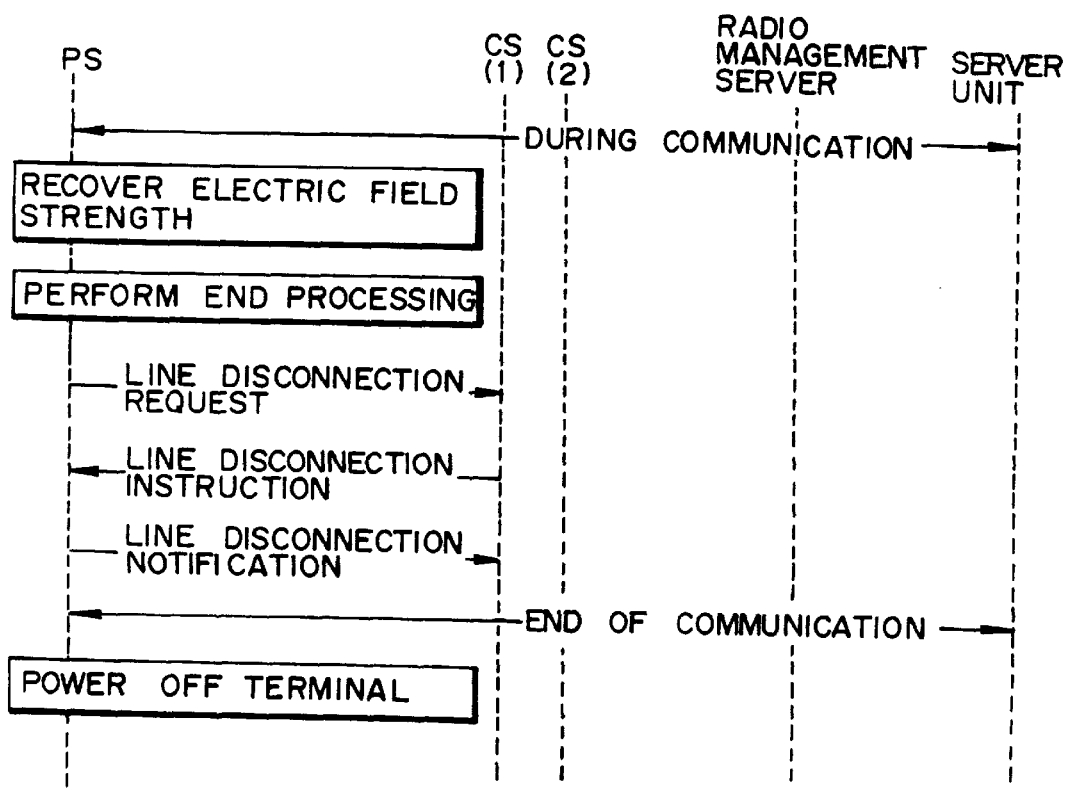
FIG. 13 is a flow chart showing a procedure as the fifth mode of the second system of the present invention.

The procedure required between the PS, the private CS, and the server unit when the electric field strength is not recovered within the disconnection determination time in the fourth mode will be described below as the fifth mode of the second system with reference to FIG. 13.

If the electric field strength is not recovered within the disconnection determination time, the data stored in the BM 4 and information indicating the current operation state are saved in the auxiliary storage unit 5. The PS (1) 22 then sends a line disconnection request to the private CS (1) 24. Upon reception of a line disconnection instruction from the private CS (1) 24, the PS (1) 22 disconnects the line, and notifies the private CS (1) 24 that the line is disconnected. The PS (1) 22 is then powered off. When the PS (1) 22 is powered on again, the operation state indicated by the information saved in the auxiliary storage unit 5 is restored. If the electric field strength is recovered, the PS (1) 22 retransmits the data saved in the auxiliary storage unit 5.

FIG. 14 is a block diagram showing the overall arrangement of the third system of the present invention.

The third system comprises first and second systems. The first system includes a line switching unit 9 to which a network 46 constituted by a server unit 15 and a client unit 47 is connected through a digital line interface section 14 and high-speed network 11 or through an analog circuit interface section 13, a public network 12, and the high-speed network 11, a radio connection unit 8 for generating position information on the basis of a position registration request from a public CS 39, a radio service control station 10 for registering the position information, and a group of unit cells each constituted by a PS 1 which establishes a channel with the public CS 39 while moving, and the public CS 39. The second system includes a network 40 constituted by a radio management server 42, a server unit 43, and a client unit 44 and a group of unit cells each constituted by the PS 1 which establishes a channel with a private CS 41 while moving, and the private CS 41.

In this system, for example, when the PS 1 is powered on, a channel is established between the PS 1 and the private CS 41 of the second system which is located in the unit cell. When the user operates a switch like a public station button which makes the user notice the use of a communication network, the data transmission/reception section 2 of the PS 1 detects the start of connection processing with respect to a public CS, thereby connecting a channel between the PS 1 and the public CS 39 of the first system which is located in the unit cell. When the private CS 41 of the second system or the public CS 39 of the first system is selected in this manner, the PS 1 can transmit/receive data to/from the server unit 43 connected to the network inside the same facilities, or can transmit/receive data to/from the server unit 15 connected to a network such as a LAN in other facilities inside the office.

What is claimed is:

1. A network system for mobile radio communication comprising a network constituted by a server unit and a client unit, a radio connection unit connected to a communication network, a public radio base station installed in a cell, and a mobile radio terminal which establishes a radio channel with said public radio base station while moving, said system being adapted to perform data communication between said server unit and said mobile radio terminal,
    each of said server unit and said mobile radio terminal including a buffer memory and an auxiliary storage unit which hold data, and said mobile radio terminal including an electric field strength monitoring section for monitoring slot errors or a reduction in electric field strength, means for storing data in said buffer memory during data transmission to said server unit when a level based on slot errors or a reduction in electric field strength is not lower than a threshold for line switching, means for sending a line switching notification to said server unit, means for sending a line switching request to said public radio base station, and means for starting to transmit the data stored in said buffer memory upon reception of a response indicating completion of line switching from said public radio base station.

2. A network system for mobile radio communication comprising a network constituted by a server unit and a client unit, a radio connection unit connected to a communication network, a public radio base station installed in a cell, and a mobile radio terminal which establishes a radio channel with said public radio base station while moving, said system being adapted to perform data communication between said server unit and said mobile radio terminal,
    said mobile radio terminal including means for instructing said server unit to store data in a buffer memory during data reception from said server unit when an electric field strength monitoring section determines that a level based on slot errors or a reduction in electric field strength is not lower than a threshold for line switching, means for sending a line switching request to said public radio base station, and means for notifying said server unit of completion of line switching upon reception of a response indicating completion of line switching from said public radio base station, and said server unit including means for starting to transmit the data stored in said buffer memory.

3. A network system for mobile radio communication comprising a network constituted by a server unit and a client unit, a radio connection unit connected to a communication network, a public radio base station installed in a cell, and a mobile radio terminal which establishes a radio channel with said public radio base station while moving, said system being adapted to perform data communication between said server unit and said mobile radio terminal,
    said mobile radio terminal including means for sending said server unit a notification indicating that line disconnection is being prepared during data reception from said server unit when a level based on slot errors or a reduction in electric field strength is not lower than a threshold for line disconnection, means for starting a timer, and means for notifying said server unit of recovery of the electric field strength when the electric field strength is recovered within a disconnection determination time, and said server unit including means for storing data in a buffer memory upon reception of the notification indicating that preparation for line disconnection is in progress from said mobile radio terminal, and means for starting to transmit the data stored in said buffer memory upon reception of a notification indicating that the electric field strength is recovered.

4. A network system for mobile radio communication comprising a network constituted by a server unit and a client unit, a radio connection unit connected to a communication network, a public radio base station installed in a cell, and a mobile radio terminal which establishes a radio channel with said public radio base station while moving, said system being adapted to perform data communication between said server unit and said mobile radio terminal,
    said mobile radio terminal including means for storing data in a buffer memory during data transmission to said server unit when an electric field strength monitoring section determines that a level based on slot errors or a reduction in electric field strength is not lower than a threshold for line disconnection, means for starting a timer, and means for starting the data stored in said buffer memory when the electric field strength is recovered within a predetermined disconnection determination time.

5. The network system according to claim 4, wherein said mobile radio terminal comprises means for outputting a line disconnection request to said public radio base station when the electric field strength is not recovered within the disconnection determination time, and means for performing termination processing in preparation for power off of said mobile radio terminal upon completion of line disconnection.

6. A network system for mobile radio communication comprising a private network constituted by a radio management server, a server unit, and a client unit, a private radio base station installed in a cell, and a mobile radio terminal which establishes a radio channel with said private radio base station while moving, said system being adapted to perform data communication between said server unit and said mobile radio terminal, each of said server unit and said mobile radio terminal including a buffer memory and an auxiliary storage unit which hold data, and said mobile radio terminal including an electric field strength monitoring section for monitoring slot errors or a reduction in electric field strength, means for storing data in said buffer memory during data transmission to said server unit when a level based on slot errors or a reduction in electric field strength is not lower than a threshold for line switching, means for sending a line switching notification to said server unit, means for sending a line switching request to said private radio base station, and means for starting to transmit the data stored in said buffer memory upon reception of a response indicating completion of line switching from said private radio base station.

7. A network system for mobile radio communication comprising a private network constituted by a radio management server, a server unit, and a client unit, a private radio base station installed in a cell, and a mobile radio terminal which establishes a radio channel with said private radio base station while moving, said system being adapted to perform data communication between said server unit and said mobile radio terminal, said mobile radio terminal including means for instructing said server unit to store data in a buffer memory during data reception from said server unit when an electric field strength monitoring section determines that a level based on slot errors or a reduction in electric field strength is not lower than a threshold for line switching, means for sending a line switching request to said private radio base station, and means for notifying said server unit of completion of line switching upon reception of a response indicating completion of line switching from said private radio base station, and said server unit including means for changing a private radio base station destination ID of the data stored in said buffer memory to a private radio base station destination ID after line switching, and means for starting to transmit the stored data.

8. A network system for mobile radio communication comprising a private network constituted by a radio management server, a server unit, and a client unit, a private radio base station installed in a cell, and a mobile radio terminal which establishes a radio channel with said private radio base station while moving, said system being adapted to perform data communication between said server unit and said mobile radio terminal, said mobile radio terminal including means for notifying said server unit that preparation for line disconnection is in progress during data reception from said server unit when an electric field strength monitoring section determines that a level based on slot errors or a reduction in electric field strength is not lower than a threshold for line switching, means for starting a timer, and means for notifying said server unit of recovery of the electric field strength when the electric field strength is recovered within a disconnection determination time, and said server unit including means for storing data in a buffer memory upon reception of a notification indicating that line disconnection is being prepared from said mobile radio terminal, and means for starting to transmit the data stored in said buffer memory upon reception of a notification indicating that the electric field strength is recovered.

9. A network system for mobile radio communication comprising a private network constituted by a radio management server, a server unit, and a client unit, a private radio base station installed in a cell, and a mobile radio terminal which establishes a radio channel with said private radio base station while moving, said system being adapted to perform data communication between said server unit and said mobile radio terminal, said mobile radio terminal including means for storing data in a buffer memory during data transmission to said server unit when an electric field strength monitoring section determines that a level based on slot errors or a reduction in electric field strength is not lower than a threshold for line disconnection, means for starting a timer, and means for starting to transmit the data stored in said buffer memory when the electric field strength is recovered within a predetermined disconnection determination time.

10. The network system according to claim 9, wherein said mobile radio terminal comprises means for outputting a line disconnection request to said public radio base station when the electric field strength is not recovered within the disconnection determination time, and means for performing termination processing in preparation for power off of said mobile radio terminal upon completion of line disconnection.

* * * * *